United States Patent [19]
Marteau et al.

[11] 3,880,899
[45] Apr. 29, 1975

[54] PROCESS FOR THE PRODUCTION OF KARITE NUT BUTTER
[76] Inventors: Robert Marteau; Antoinette Danvin Epouse Marteau, both of Festival 95, Ave. Cyrille Besset, 06 Cros de Cagnes, France
[22] Filed: Aug. 2, 1973
[21] Appl. No.: 384,828

[52] U.S. Cl. ............................................. 260/412.2
[51] Int. Cl. ............................ C09f 5/02; C11b 1/00
[58] Field of Search ................................. 260/412.2

[56] References Cited
UNITED STATES PATENTS
3,451,990  6/1969  Solé Jr. ............................. 260/123.5
FOREIGN PATENTS OR APPLICATIONS
841,355  7/1960  United Kingdom .............. 260/412.2

Primary Examiner—Elbert L. Roberts
Attorney, Agent, or Firm—Young & Thompson

[57] ABSTRACT

Karite nut butter is extracted by roasting the nuts over a wood fire and then shelling them. The shelled nuts are crushed to small pieces with wooden crushers and then heated in earthenware vessels over a wood fire for about 30 minutes, after which they are dried in the sun. They are then fine ground in wooden vessels and two parts are diluted with one part of water and the resulting paste heated to 70°–80° C. while stirring with wooden paddles. The nut butter is skimmed from the surface with wooden paddles, and about 2 percent of wood ash and karite leaves is added to the butter, which can then be stored for long times.

1 Claim, No Drawings

PROCESS FOR THE PRODUCTION OF KARITE NUT BUTTER

The present invention relates to a process for the extraction of karite nut butter, and has for its object the provision of such a process in which the resulting product will be storable for long periods of time without mold formation, without losing any of its properties, and without acquiring any odor other than its original one.

The karite is a tree of the Sudan, the seeds of which (karite nuts) contain a fatty substance called "karite nut butter" which is employed especially for the preparation of cosmetics and of therapeutic products due to its soothing and healing effects on the skin, its bracing effect on the muscles, and also for the manufacture of margarine.

Unfortunately, the industrial methods employed in the extraction of karite nut butter and its treatment with chemical products destroy most of its beneficial properties and adversely affect its storage life.

The present invention relates to an extraction process which is characterized essentially in that only utensils of wood are employed since the inventor has discovered that contact with iron or other metals spoils karite nut butter in that it loses its vitamin and other qualities and does not store well. It becomes rancid, a mold forms on the surface, and it assumes a very strong, unpleasant odor, different from its own fresh, natural odor, regarding which opinions differ.

A preferred method of operation for carrying out the process according to the invention will now be described in detail.

The karite nuts are first roasted over a wood fire and are then shelled. The seeds are then crushed down into small pieces with wooden crushers. These pieces are then heated in earthenware vessels over a wood fire for about thirty minutes, after which the pieces are laid out in the open air, preferably exposed to the sun. When they have thus lost their moisture and also certain volatile products, they are finally ground down finely in wooden vessels to reduce them to a homogeneous paste. The paste is then poured into water brought to a temperature of 70°–80° C. in earthenware pots, in the proportion of approximately 2 parts paste to 1 part water. The mixture is stirred with wooden dashers and, accompanied by continuous stirring for, for example, 2½ hours, it is brought to its boiling point. On the surface, layers of a fatty, yellowish, oily substance are formed. These layers are skimmed off with wooden ladles which shape the butter in the hot, liquid state. A small quantity, for example 2 percent, of wood ash and karite leaves is added. This is mixed well, it is filtered, and the warm liquid is poured into neutral receptacles.

The karite nut butter thus prepared may be stored without alteration for a very long time (for years, in fact) in closed or open receptacles without any trace of mold formation, without losing any of its properties, and without acquiring any odor other than its own original one.

From a consideration of the foregoing disclosure, therefore, it will be evident that the initially recited object of the invention has been achieved.

Although the present invention has been described in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having thus described our invention, we claim:

1. A process for the extraction of karite nut butter, comprising shelling karite nuts to obtain karite seeds, crushing the seeds to small pieces, heating the crushed pieces in earthenware vessels to drive off volatile compounds, fine grinding the crushed and heated pieces to a paste which is mixed with water, heating the water to about 70°–80°C. while stirring the paste with wooden stirrers, bringing the paste to its boiling point, skimming the karite nut butter from the surface of the mixture, and thereafter adding about 2 percent of wood ash and karite leaves to the nut butter.

* * * * *